US011498479B2

(12) United States Patent
Boiroux et al.

(10) Patent No.: US 11,498,479 B2
(45) Date of Patent: Nov. 15, 2022

(54) DEVICE FOR LIGHTING THE PASSENGER COMPARTMENT OF A MOTOR VEHICLE, THE DEVICE BEING CAPABLE OF PROJECTING A PIXELIZED LIGHT BEAM

(71) Applicant: Valeo Vision, Bobigny (FR)

(72) Inventors: Nicolas Boiroux, Bobigny (FR); Thierry Fleurence, Bobigny (FR); Arnaud Robert, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/312,863

(22) PCT Filed: Nov. 28, 2019

(86) PCT No.: PCT/EP2019/082876
§ 371 (c)(1),
(2) Date: Jun. 10, 2021

(87) PCT Pub. No.: WO2020/126388
PCT Pub. Date: Jun. 25, 2020

(65) Prior Publication Data
US 2022/0063492 A1 Mar. 3, 2022

(30) Foreign Application Priority Data
Dec. 17, 2018 (FR) ...................................... 1873082

(51) Int. Cl.
*B60Q 3/60* (2017.01)
*B60Q 3/80* (2017.01)
(Continued)

(52) U.S. Cl.
CPC ................. *B60Q 3/60* (2017.02); *B60Q 3/80* (2017.02); *B60Q 3/74* (2017.02); *B60Q 3/76* (2017.02)

(58) Field of Classification Search
CPC ... B60Q 3/60; B60Q 3/74; B60Q 3/75; B60Q 3/80
See application file for complete search history.

(56) References Cited

U.S. PATENT DOCUMENTS

| 7,025,485 B2 * | 4/2006 | Henry .................... B60Q 1/302 |
| | | 362/249.02 |
| 2003/0043590 A1 | 3/2003 | Walser et al. |
| (Continued) | | |

FOREIGN PATENT DOCUMENTS

| DE | 102012022716 A1 | 5/2013 |
| EP | 3210829 A1 | 8/2017 |
| EP | 3290777 A1 | 3/2018 |

OTHER PUBLICATIONS

European Patent Office, International Search Report (w/English translation) of corresponding International Application No. PCT/EP2019/082876, dated Feb. 14, 2020.

*Primary Examiner* — Thomas M Sember
(74) *Attorney, Agent, or Firm* — Valeo Vision

(57) ABSTRACT

The invention relates to a lighting device for a motor vehicle's interior that includes a first optical module, a plurality of selectively activated light sources that are mounted on a support; an optical element for collecting light rays from light sources; the optical element further including primary positioning members and the support that includes primary complementary positioning members; the optical element mounted in such a way on the support that primary positioning members collaborate with primary complementary positioning members.

16 Claims, 3 Drawing Sheets

(51) Int. Cl.
   *B60Q 3/74* (2017.01)
   *B60Q 3/76* (2017.01)

(56) References Cited

U.S. PATENT DOCUMENTS

| | | |
|---|---|---|
| 2008/0084693 A1* | 4/2008 | Shimada ................ F21S 8/026 362/240 |
| 2014/0267975 A1 | 9/2014 | Ying et al. |
| 2017/0240105 A1 | 8/2017 | Lecorre et al. |
| 2018/0058651 A1 | 3/2018 | Gromfeld |

* cited by examiner

[Figure 1]
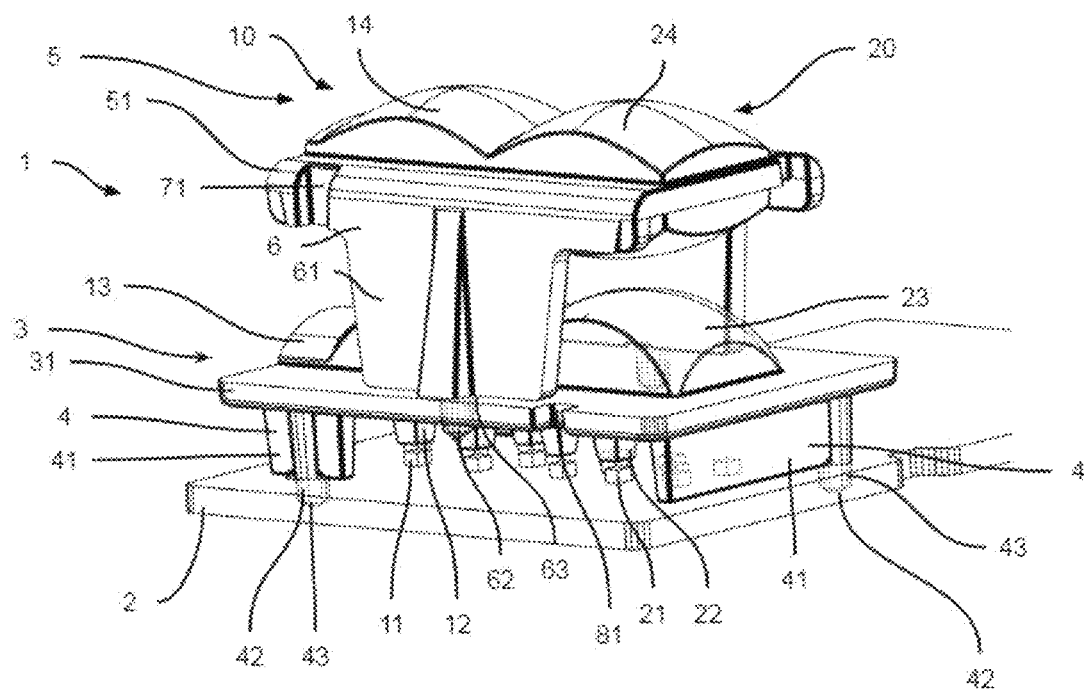
[Figure 2]
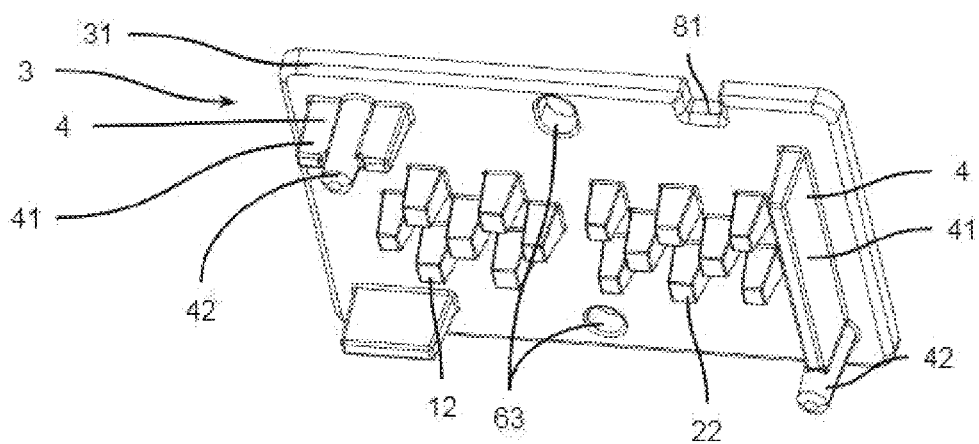

[Figure 3]
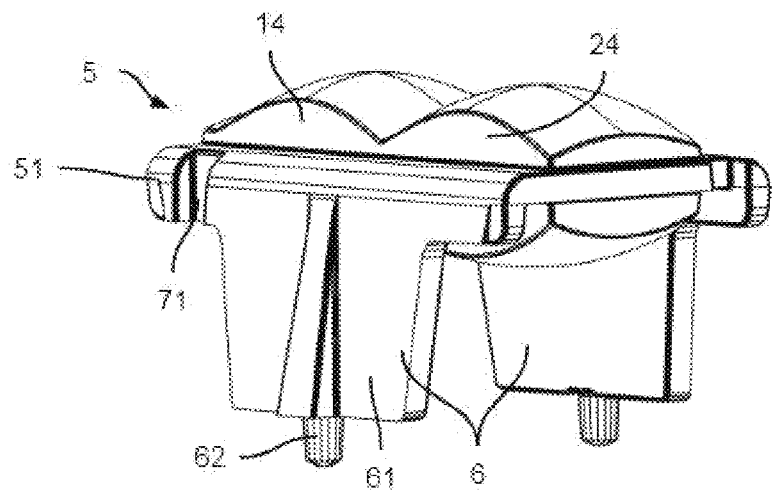
[Figure 4]
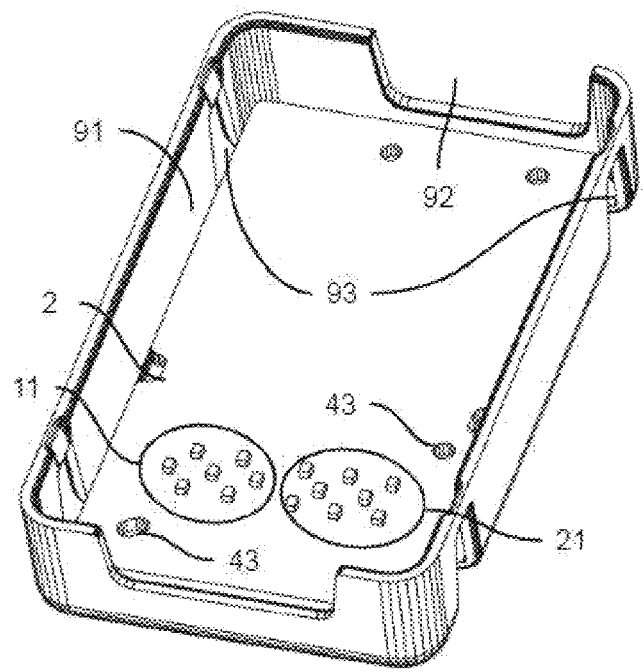

[Figure 5]
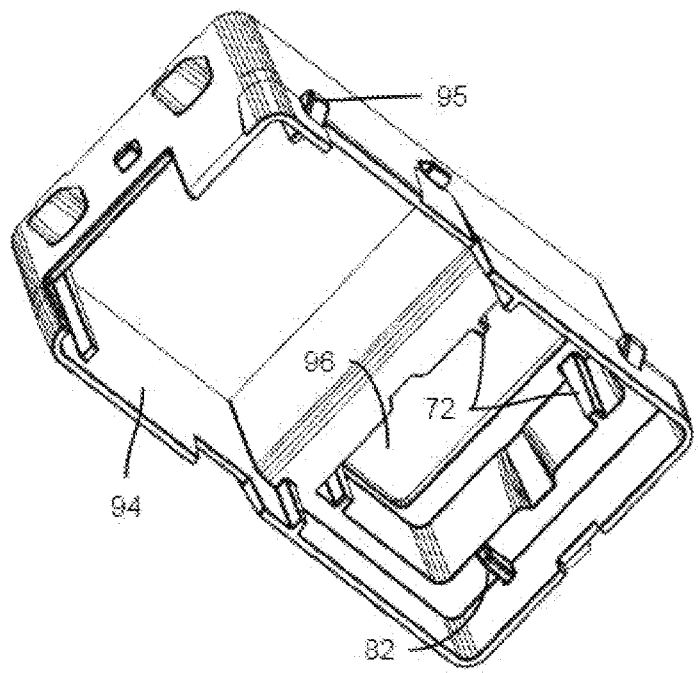
[Figure 6]
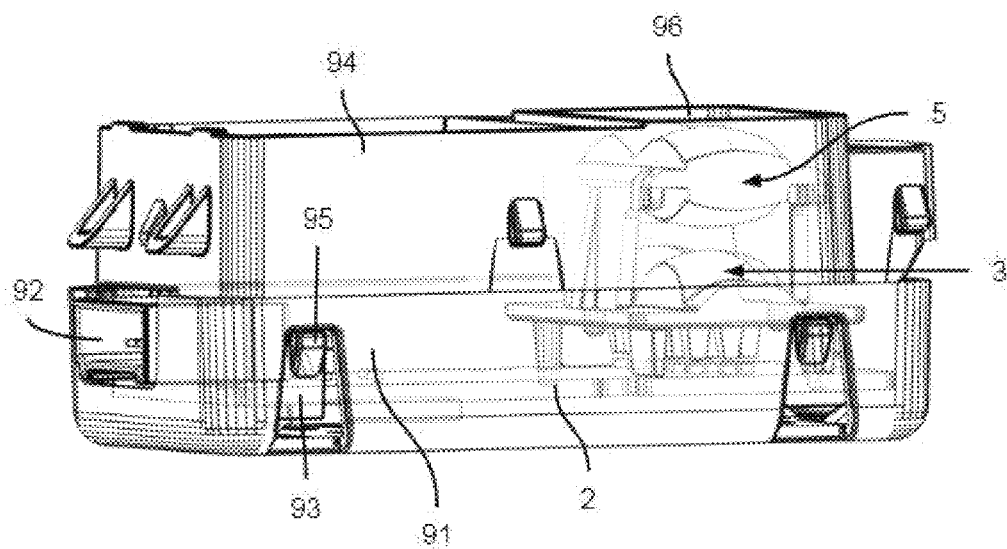

DEVICE FOR LIGHTING THE PASSENGER COMPARTMENT OF A MOTOR VEHICLE, THE DEVICE BEING CAPABLE OF PROJECTING A PIXELIZED LIGHT BEAM

CROSS-REFERENCE TO RELATED APPLICATIONS

This is a 371 application (submitted under 35 U.S.C. § 371) of International Application No. PCT/EP2019/082876 (WO2020126388) filed on Nov. 28, 2019, which claims the priority date benefit of French Application No. FR1873082 filed on Dec. 17, 2018, the disclosures of which are hereby incorporated by reference in their entirety.

TECHNICAL FIELD

The present invention relates to a device for lighting the interior of a motor vehicle, the device being capable of projecting a pixelized light beam into the interior.

BACKGROUND

Conventionally, the interior of a vehicle is provided with a plurality of lighting devices, such as an overhead light and reading lights. As many types of system are needed as there are types of lighting desired, and the functionalities of such lighting systems are limited. Manufacturers have therefore had to combine several interior-lighting functions into a matrix-type lighting function.

A device for forming a light beam configured to emit a pixelized beam of light into a motor vehicle interior is known, for example, from document EP 3 210 829. This device comprises a plurality of light sources, a plurality of waveguides associated with the light sources, and a projection optical element. In this device, it is necessary for the various above-mentioned elements to be perfectly positioned relative to one another, otherwise the optical performance of the device may be greatly reduced. Specifically, if the light source should shift from its optimal position facing the associated waveguide, a loss of sharpness in the shape of the pixel projected by the projection optical element from the rays emitted by this source, or else a shifting of this pixel with respect to the other pixels, or else a loss in lighting power, may be observed. This results in a beam of light that is not uniform or else is of reduced intensity, resulting in a loss of comfort to the user.

One solution to this problem is to use an additional mechanical referencing component, to which all of the elements of the device are fixed so as to guarantee their respective positions. However, this solution entails the use of an additional component, which increases the cost of the device and complicates the assembling of the elements with one another during the production of the device.

The invention falls within this context and seeks to improve the relative positioning of the various elements that make up a motor vehicle interior lighting device creating a beam of light that is pixelized, without increasing the cost thereof.

The invention thus relates to a lighting device for the interior of a motor vehicle, comprising a first optical module comprising a plurality of light sources that can be activated selectively and that are mounted on a support, an optical element for collecting the rays emitted by the light sources, the optical element comprising primary positioning members and the support comprising primary complementary positioning members, the optical element being mounted on the support in such a way that each primary positioning member collaborates with one of the primary complementary positioning members.

It will thus be appreciated that the relative positioning of the optical element is done directly on the support of the light sources, via the primary positioning members. In that way, the positioning is as accurate as possible, without the need to resort to an additional component.

Advantageously, the lighting device is configured to illuminate the interior in an application of the reading-light type and for this purpose is positioned, for example, in the front central overhead lighting fixture of the vehicle. If appropriate, the selective activation allows the generation of elementary beams that may vary over time, in terms of their periodicity, their intensity and/or their color, so as to form, in at least one region of the interior, at least one sharp pixelized static and/or dynamic image such as, for example, ambient imaging, a logo or else a pictogram.

Advantageously, each light source comprises a light-emitting semiconductor chip, notably a light-emitting diode. Where appropriate, the support for the light sources is a printed circuit board.

SUMMARY

In one embodiment of the invention, the optical element is a primary optical element configured to form an elementary beam from rays emitted by each of the light sources. Where appropriate, the primary optical element may be a single component comprising a collector rear part, for example comprising primary collector members arranged respectively facing one of the light sources to collect the rays emitted by the corresponding source, and an output front part which forms, for example, a corrective lens, the collector rear part and output front part being connected to one another at a meeting surface, for example a meeting plane. The primary collector members formed in the rear part of the primary optical element may respectively adopt the form of a light guide or of a lens or of a collimator and may respectively have a square, rectangular, or round cross section. If desired, the output front part may have an output face of substantially hemispherical profile. In this way, each primary collector member may be coupled to a light source in such a way that the majority of the light rays emitted by this light source enter the primary collector member dedicated to it via an input face of this member and are deflected to the meeting plane from which the rays re-emerge shaped into a narrower pencil beam forming a square or rectangular, or even round, pixel and are then deflected by the output front part to form the elementary beam.

Advantageously, the optical element comprises a mechanical part on which the primary positioning members are formed. Where appropriate, the mechanical part may consist of a plate situated at the meeting plane connecting the collector rear part and the output front part and extending, for example, on either side of these rear and front parts.

In one embodiment of the invention, each primary positioning member comprises a rib extending from a rear face of the mechanical part toward the support and designed to rest against a front face of the support. Where appropriate, the length of the rib may be greater than the length of the primary collector members. That measure avoids, on the one hand, contact between the primary collector members and the light sources, which contact could be detrimental, and ensures correct positioning of the primary collector members with respect to the light sources in a direction parallel to the optical axis of the primary optical element.

Advantageously, each primary positioning member further comprises a peg extending from the rib toward the support, each primary complementary positioning member being formed by an orifice formed in the support and into which the peg is inserted. This then ensures correct positioning of the primary collector members with respect to the light sources, in directions perpendicular to the optical axis of the primary optical element.

In another embodiment, each primary positioning member could comprise just a peg extending from a rear face of the mechanical part toward the support.

Advantageously, the first optical module may comprise a secondary optical element configured to project each elementary beam formed by the primary optical element into the interior. For example, the meeting plane at which the collector rear part and the output front part of the primary optical element meet may coincide with an objective focal plane of the projection secondary optical element. This then ensures sharp projection into the interior of an image formed at the output of the primary collector members, namely an elementary beam which is square, round or rectangular in cross section. The secondary optical element may for example comprise an additional lens, for example a biconvex lens or else a reflector or else a combination of one or more of these elements. It should be noted that, in the case of a primary optical element output front part that forms a corrective lens, the objective of this corrective lens is to correct optical aberrations introduced by the whole of the optical system made up of the primary and secondary optical elements.

Advantageously, the secondary optical element comprises secondary positioning members and the primary optical element comprises secondary complementary positioning members, the secondary optical element being mounted on the primary optical element in such a way that each secondary positioning member collaborates with one of the secondary complementary positioning members. This feature then allows the various elements that make up the first optical module to be stacked, each element being positioned on top of the element beneath so as to obtain a product that can be assembled easily, during its production.

Advantageously, the secondary optical element comprises a mechanical part on which the secondary positioning members are formed, the secondary complementary positioning members being formed in the mechanical part of the primary optical element. Thus, the mechanical part of the primary optical element contributes both to the positioning of the primary optical element with respect to the light sources and to the positioning of the secondary optical element with respect to the primary optical element.

For example, each secondary positioning member may comprise a rib extending from a rear face of the mechanical part of the secondary optical element toward the primary optical element and designed to rest against a front face of the mechanical part of the primary optical element. Where appropriate, each secondary positioning member may further comprise a peg extending from the rib toward the primary optical element, each secondary complementary positioning member being formed by an orifice formed in the mechanical part of the primary optical element and into which the peg is inserted. As a variant, each secondary positioning member could comprise just a peg extending from a rear face of the mechanical part of the secondary optical element toward the secondary optical element. If desired, at least one of the orifices of the mechanical part of the primary optical element may be an orifice of oblong shape, notably allowing statically determinate positioning of the secondary optical element.

In one embodiment of the invention, the device comprises a rear cover in which the support is housed, and a front cover comprising a housing to accept the secondary optical element. The front cover may be fixed, notably by clip-fastening, to the rear cover so as to hold the support, the primary optical element, and the secondary optical element in position. The front cover then immobilizes on the rear cover the stack formed by the support, the primary optical element and the secondary optical element. Where appropriate, the housing may have an aperture through which the elementary beams projected by the secondary optical element can pass. If desired, the rear cover may comprise an opening to accept a connector supported by the support and intended to receive a supply of electrical power to electrically power the light sources.

Advantageously, the secondary optical element comprises poka-yoke members and the housing of the front cover comprises complementary poka-yoke members intended to collaborate with the poka-yoke members of the secondary optical element when the secondary optical element is installed in the housing. These poka-yoke members guarantee that the secondary optical element will be mounted in the correct position when the device is assembled. They may, for example, be one or more grooves formed on interior walls of the housing and one or more slots formed in the mechanical part of the secondary optical element, the profile of the mechanical part thus being asymmetric once rotated through 180°.

If desired, the primary optical element may also comprise poka-yoke members intended with complementary poka-yoke members of the front cover.

Advantageously, the lighting device may comprise a second optical module comprising a plurality of light sources that can be activated selectively and an optical element for collecting the rays emitted by the light sources, wherein the light sources of the second optical module are mounted on the support of the first optical module, and wherein the optical elements of the first and of the second optical module form one single piece. For example, the primary optical elements of the first and of the second optical module may form a single primary component; and the secondary optical elements may likewise form a single secondary component. In that way, the respective positioning members for the primary and secondary optical elements can be shared, so as to make the assembly easier to assemble and reduce the cost of the device.

Advantageously, the first and second optical modules are arranged in such a way that the elementary beams projected by the secondary optical elements are superposed or interlaced. For example, the first and second modules may be arranged in such a way that all the elementary beams emitted by the one same module together form a chequerboard pattern, the chequerboard patterns formed by the first and second modules complementing one another. This then guarantees that the overall beam emitted by the lighting device, namely the beam emitted when all the light sources of the first and second modules are activated, is uniform.

Advantageously, the lighting device comprises an electronic circuit able to receive control instructions and designed to activate one or more of the light sources selectively according to said control instructions. For example, the lighting device may be provided with a touch-sensitive interface, the touch-sensitive interface being designed to detect interactions of a user with the interface and to emit accordingly control instructions to illuminate one or more pixels in the interior, for example to perform a reading-light function or else an ambient-lighting function. Where appropriate, the electronic circuit is designed to select the light sources that are to be activated in order to perform said function and to activate these sources.

BRIEF DESCRIPTION OF THE DRAWINGS

Other features and advantages of the present invention will be better understood with the aid of the description of the examples and of the drawings, in which:

FIG. 1 is a partial depiction of a motor vehicle interior lighting device according to one embodiment of the invention;

FIG. 2 depicts a view from beneath of the primary optical element of the lighting device of FIG. 1;

FIG. 3 depicts a view of the secondary optical element of the lighting device of FIG. 1;

FIG. 4 depicts a view from above of a rear cover housing the support of the lighting device of FIG. 1;

FIG. 5 depicts a view from beneath of a front cover intended for the lighting device of FIG. 1; and FIG. 6 depicts a view of the lighting device of FIG. 1 housed in the front and rear covers of FIG. 4 and FIG. 5.

DETAILED DESCRIPTION

Although the figures set out the invention in detail for implementation, said figures may be used in order to better define the invention if necessary. Likewise, it must be remembered that, across all of the figures, the same elements are denoted by the same references. It will also be understood that the embodiments of the invention illustrated in the figures are given by way of non-limiting examples. As a result, other configurations of the lighting system according to the invention may be produced, particularly by varying the arrangement and the dimensioning of the primary light sources, of the primary optical element and, in particular, of the primary members, and also of the secondary optical element.

FIG. 1 depicts a motor vehicle interior lighting device 1. This device 1 comprises two optical modules 10 and 20 each comprising a plurality of light-emitting diodes 11 and 21 that can be activated selectively by an electronic circuit (not depicted) and that are mounted on a common printed circuit board 2.

Each optical module 10 and 20 comprises a primary optical element comprising a collector rear part formed of the primary collector members 12 and 22 and an output front part formed by a corrective lens 13 and 23. The primary collector members of each optical module consist of square-section light guides 12 and 22, visible notably in [FIG. 2], each respectively arranged facing one of the light-emitting diodes 11 and 21 to collect the rays emitted by this diode. Each corrective lens 13 and 23 has an output face in the form of a hemispherical dome. The collector rear part and the output front part are joined together at a meeting plane. In this way, each light guide 12 and 22 is coupled to a light-emitting diode 11 and 21 in such a way that the majority of the light rays emitted by this diode enter the light guide dedicated to it via an input face of this guide and are guided to the meeting plane, the rays being shaped at this meeting plane into a narrower pencil beam forming a square or rectangular, or even round, pixel and are then deflected by the corrective lens to form an elementary beam.

As depicted in FIG. 1 and FIG. 2, the primary optical elements of the modules 10 and 20 form a single one-piece component 3. The primary collector members 12 of the module 10 are arranged in a chequerboard pattern and the primary collector members 22 of the module 20 are likewise arranged in a chequerboard pattern, with a distribution that complements that of the chequerboard pattern of the module 10. Thus, the elementary beams formed by the module 10 can be interlaced with the elementary beams formed by the module 20 so that an elementary beam formed by the module 10 is arranged between two elementary beams formed by the module 20.

Furthermore, each module 10 and 20 further comprises a secondary optical element 14 and 24, in the form of a biconvex lens (also visible in FIG. 3), configured to project each elementary beam formed by the primary optical element of the module into the interior. Thus, the meeting plane at which the collector rear part 12 and 22 and the output front part 13 and 23 of the primary optical element coincides with an objective focal plane of the projection secondary optical element 14 and 24. The secondary optical elements 14 and 24 form a single one-piece component 5.

The component 3 comprising the primary optical elements comprises a mechanical part 31 in the form of a plate 31 situated at the meeting plane connecting the primary collector members 12 and 22 to the corrective lenses 13 and 23. The component 3 further comprises two ribs 41 extending from a rear face of the plate 31 toward the support 2. Each rib 41 has a length greater than that of the light guides 12 and 22 so as to press on a front face of the support 2 in order to avoid contact between the light-emitting diodes 11 and 21 and the light guides 12 and 22, and so as to position the input faces of the light guides 12 and 22 at the correct distance from the diodes 11 and 21 in a direction of longitudinal extension of these light guides 12 and 22. Further, each rib 41 is provided with a peg 42, extending either on one side of the rib or in the center of the rib and toward the support 2. The support 2 further comprises orifices 43, in which these pegs 42 are inserted, so as to position the input faces of the light guides 12 and 22 correctly facing the light-emitting diodes 11 and 21 supported by the support 2. The assembly comprising rib 41 and peg 42 thus forms primary positioning members 4 collaborating with primary complementary positioning members 43 to guarantee correct positioning of the input faces of the light guides 12 and 22 with respect to the light-emitting diodes 11 and 22, so that the coupling of these guides with these diodes is optimal and allows the formation of an elementary light beam of controlled shape.

The component 5 comprising the secondary optical elements also comprises a mechanical part 51 on which there are formed ribs 61 extending toward the component 3 and provided with pegs 62. The component 5 is stacked on the component 3 in such a way that the ribs 61 rest on an upper face of the mechanical part 31. Furthermore, the mechanical part 31 of the component 3 is provided with orifices 63 into which the pegs 62 are inserted. The assembly comprising 61 and peg 62 thus forms secondary positioning members 6 collaborating with secondary complementary positioning members 63 to guarantee that the focal plane of the projection lenses 14 and 24 is superposed with the meeting plane of the light guides 12 and 22 and of the corrective lenses 13 and 23 so that the elementary beams formed by these light guides are projected as sharply as possible.

FIG. 4 depicts the support 2 housed in a rear cover 91, FIG. 5 depicts a front cover 92, and FIG. 6 depicts the lighting device of FIG. 1 assembled with this rear cover 91 and this front cover 92.

The rear cover 91 comprises openings 93 and the front cover 92 comprises clips 95 intended to collaborate by clip-fastening with the openings 93 of the rear cover 91 in order to assemble the two covers with one another. The rear cover 91 further comprises an opening 92 to accept a connector (not depicted) supported by the support 2 and intended to receive a supply of electrical power to electrically power the light-emitting diodes 11 and 21.

The front cover 92 comprises a housing 96 intended to accept the component 5 comprising the secondary optical elements 14 and 24. This housing has an aperture in order to allow the elementary beams of light projected by these secondary optical elements to exit toward the vehicle interior. The component 5 comprising the secondary optical elements 14 and 24 comprises slots 71 produced on the mechanical part 51 and the housing 96 comprises grooves 72 produced on the interior walls of the housing. The slots 71 are intended to accept the grooves 72 so as to guarantee that the secondary optical elements 14 and 24 will be mounted in the correct position when inserted in the housing 96.

Furthermore, the mechanical part 31 of the component 3 comprising the primary optical elements also comprises a slot 81 intended to receive a groove 82 made in the front cover 94 to guarantee that the primary optical elements will be positioned correctly when the component 5 is being stacked on the component 3.

It may thus be seen from FIG. 6 that the stack of the component 5 on the component 3, itself stacked on the support 2, is immobilized and held in position when the front cover 94 is clipped onto the rear cover 91.

The lighting device 1 is thus configured to illuminate the vehicle interior in an application of the reading-light type with a pixelized light beam forming by a plurality of elementary light beams, the selective activation of the light-emitting diodes 11 and 21 making it possible to generate elementary beams that can vary over time in terms of their periodicity, their intensity and/or their color.

The foregoing description clearly explains how the invention is able to achieve the objectives it has set itself and notably that of proposing a motor vehicle interior lighting device of which the various elements are correctly positioned with respect to one another, without additional cost. The lighting device is thus able to project a pixelized light beam that is uniform and the pixels of which are sharp, so that it can be used comfortably by a user of the vehicle interior.

The invention is not limited to the embodiments specifically given in this document by way of non-limiting examples, and extends in particular to all equivalent means and to any technically workable combination of these means. Thus, the features, variants and various embodiments of the invention may be combined with one another, in various combinations, provided that they are not mutually incompatible or exclusive.

What is claimed is:

1. A lighting device for an interior of a motor vehicle, comprising: a first optical module comprising a plurality of light sources mounted on a support, an optical element including a number of primary positioning members, where the support includes a number of complementary positioning members, the optical element being mounted on the support in a manner that each primary positioning member collaborates with at least one of said complementary positioning members; wherein the optical element is a primary optical element and wherein the first optical module includes a secondary optical element; a front cover including a housing to accept the secondary optical element; a rear cover in which the support is housed; wherein the secondary optical element includes a number of secondary positioning members and the primary optical element includes a number of secondary complementary positioning members, the secondary optical element being mounted on the primary optical element in a manner that each secondary positioning member collaborates with one of the secondary complementary positioning members; wherein the secondary optical element includes a number of poka-yoke members and where the housing includes a number of complementary poka-yoke members intended to collaborate with a respective number of poka-yoke members of the secondary optical element upon an installation in the housing.

2. The lighting device of claim 1, wherein the primary optical element configured to form an elementary beam from rays emitted by each of said light sources.

3. The lighting device of claim 2, wherein the first optical module which includes the secondary optical element is configured to project the elementary beam formed by the primary optical element into the interior.

4. The lighting device of claim 1, wherein the optical element includes a mechanical part on which said primary positioning members are formed.

5. The lighting device of claim 1, wherein each primary positioning member includes a rib extending from a rear face of a mechanical part toward the support and is designed to rest against a front face of the support.

6. The lighting device of claim 1, wherein each primary positioning member further includes a peg extending from a rib toward the support, each complementary positioning member being formed by an orifice formed in the support and into which the peg is inserted.

7. The lighting device of claim 1, wherein the primary optical element includes said number of poka-yoke members intended to collaborate with said number of complementary poka-yoke members of the front cover.

8. The lighting device of claim 1, including a second optical module including a plurality of light sources that can be activated selectively and an optical element for collecting a number of rays emitted by the light sources, wherein the light sources of the second optical module are mounted on the support of the first optical module, and wherein the optical elements of the first and of the second optical module are configured to form one single piece.

9. The lighting device of claim 1, comprising an electronic circuit configured to receive control instructions and designed to activate at least one of the light sources selectively according to said control instructions.

10. A lighting device of a motor vehicle for an interior, comprising: a first optical module including a number of light sources that are mounted on a support; the first optical module including a number of secondary positioning members and the support including a number of complementary positioning members, the first optical module mounted on the support in a manner that each primary positioning member collaborates with at least one respective complementary positioning member; a second optical module including a number of light sources; wherein said light sources of the second optical module are mounted on the support of the first optical module, and wherein optical elements of the first optical module and of the second optical module form one single piece; wherein a first optical element is a primary optical element and wherein the first optical module includes a secondary optical element; a front cover including a housing to accept the one single piece; a rear cover in which the support is housed; wherein the secondary optical element includes a number of secondary positioning members and the primary optical element includes a number of secondary complementary positioning members, the secondary optical element being mounted on the one single piece in a manner that each secondary positioning member collaborates with at least one orifice through a respective peg; wherein the secondary optical element includes a number of poka-yoke members and where the housing includes a number of complementary poka-yoke members intended to collaborate with a respective number of poka-yoke members of the secondary optical element upon installation with the housing.

11. The lighting device as claimed of claim 10, wherein a secondary optical element includes a number of secondary positioning members and a primary optical element includes a number of secondary complementary positioning members, the secondary optical element being mounted on the primary optical element in such a way that each secondary positioning member collaborates with one of a secondary complementary positioning members.

12. The lighting device of claim 11, wherein the secondary optical element includes a mechanical part on which the secondary positioning members are formed, the secondary complementary positioning members being formed in the mechanical part of the primary optical element.

13. The lighting device of claim 12, wherein each secondary positioning member includes a rib extending from a rear face of the mechanical part of the secondary optical element toward the primary optical element and designed to rest against a front face of the mechanical part of the primary optical element.

14. The lighting device of claim 13, wherein each secondary positioning member further includes a peg extending from the rib toward the primary optical element, each secondary complementary positioning member being formed by an orifice formed in the mechanical part of the primary optical element and into which the peg is inserted.

15. The lighting device of claim 14, wherein the front cover being fixed to the rear cover in a manner configured to hold the support, the primary optical element and the secondary optical element held in a secured position.

16. A lighting device of a motor vehicle for an interior, comprising: a first optical module including a number of light sources that are mounted on a support; a primary optical element including a number of primary positioning members and the support including a number of complementary positioning members, the primary optical element mounted on the support in a manner that each primary positioning member collaborates with at least one of the complementary positioning members; wherein the primary optical element includes a mechanical part on which said primary positioning members are formed; wherein each primary positioning member further includes a peg extending from a rib toward the support, each complementary positioning member being formed in the support and into which the peg is inserted; wherein the first optical module includes a secondary optical element; a front cover including a housing to accept the first optical module; a rear cover in which the support is housed; and wherein the secondary optical element includes a number of poka-yoke members and where the housing includes a number of complementary poka-yoke members that are configured to respectively mate upon an installation in the housing.

* * * * *